(12) United States Patent
Li et al.

(10) Patent No.: US 11,545,036 B2
(45) Date of Patent: *Jan. 3, 2023

(54) REAL-TIME DRIVING BEHAVIOR AND SAFETY MONITORING

(71) Applicant: Google LLC, Mountain View, CA (US)

(72) Inventors: Xinyu Li, Jersey City, NY (US); Chen-Ping Yu, Santa Clara, CA (US); Aaditya Chandrasekhar, San Francisco, CA (US)

(73) Assignee: Google LLC, Mountain View, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/721,801

(22) Filed: Dec. 19, 2019

(65) Prior Publication Data

US 2020/0126423 A1 Apr. 23, 2020

Related U.S. Application Data

(63) Continuation of application No. 16/255,824, filed on Jan. 24, 2019, now Pat. No. 10,573,183.

(60) Provisional application No. 62/737,665, filed on Sep. 27, 2018.

(51) Int. Cl.
| | | |
|---|---|---|
| *G06F 17/10* | (2006.01) | |
| *G06G 7/78* | (2006.01) | |
| *G08G 1/16* | (2006.01) | |
| *G06N 20/00* | (2019.01) | |
| *B60Q 9/00* | (2006.01) | |
| *G07C 5/00* | (2006.01) | |
| *G07C 5/08* | (2006.01) | |

(52) U.S. Cl.
CPC ............. *G08G 1/166* (2013.01); *B60Q 9/008* (2013.01); *G06N 20/00* (2019.01); *G07C 5/008* (2013.01); *G07C 5/085* (2013.01)

(58) Field of Classification Search
CPC ........ G08G 1/166; G06N 20/00; B60Q 9/008; G07C 5/008; G07C 5/085
USPC .......................................................... 701/301
See application file for complete search history.

(56) References Cited

U.S. PATENT DOCUMENTS

| | | | |
|---|---|---|---|
| 8,195,386 B2 | 6/2012 | Hu et al. | |
| 8,493,198 B1 * | 7/2013 | Vasquez | B60Q 9/008 340/436 |
| 9,275,552 B1 * | 3/2016 | Fields | G01C 21/3676 |

(Continued)

FOREIGN PATENT DOCUMENTS

| | | |
|---|---|---|
| CN | 103105174 A | 5/2013 |
| KR | 20120007781 U | 11/2012 |

(Continued)

OTHER PUBLICATIONS

"Augmented Reality & Driving: enhancing the driving experience", https://www.youtube.com/watch?v=0OdZXf1E7Z8 (retrieved Jan. 24, 2019).

(Continued)

*Primary Examiner* — Mahmoud S Ismail
(74) *Attorney, Agent, or Firm* — Shumaker & Sieffert, P.A.

(57) ABSTRACT

A system and method may track data from one or more sensors during vehicle driving. Based on the sensors data, one or more alerts or potential hazards may be identified. The system and method may generate a drive summary including information and optional statistics about the alerts or potential hazards.

20 Claims, 5 Drawing Sheets

(56) References Cited

U.S. PATENT DOCUMENTS

| | | | |
|---|---|---|---|
| 10,013,697 B1* | 7/2018 | Cote | G06Q 30/0208 |
| 10,055,650 B2 | 8/2018 | Ho et al. | |
| 2012/0127876 A1 | 5/2012 | Hunukumbure | |
| 2012/0224060 A1 | 9/2012 | Gurevich et al. | |
| 2012/0226437 A1 | 9/2012 | Li et al. | |
| 2012/0253670 A1* | 10/2012 | Nagda | G08G 1/09626 |
| | | | 701/500 |
| 2013/0194110 A1 | 8/2013 | Kim et al. | |
| 2014/0063064 A1 | 3/2014 | Seo et al. | |
| 2014/0095305 A1* | 4/2014 | Armitage | G06Q 30/0251 |
| | | | 705/14.49 |
| 2014/0199662 A1* | 7/2014 | Armitage | B60K 35/00 |
| | | | 434/65 |
| 2014/0354684 A1* | 12/2014 | Beckwith | G06K 9/00671 |
| | | | 345/633 |
| 2014/0362195 A1 | 12/2014 | Ng-Thow-Hing et al. | |
| 2015/0046812 A1 | 2/2015 | Darby et al. | |
| 2015/0062168 A1 | 3/2015 | Ng-Thow-Hing et al. | |
| 2015/0070178 A1 | 3/2015 | Kline | |
| 2015/0112542 A1* | 4/2015 | Fuglewicz | G07C 5/0816 |
| | | | 701/32.2 |
| 2015/0175068 A1 | 6/2015 | Szostak et al. | |
| 2015/0204687 A1 | 7/2015 | Yoon et al. | |
| 2016/0284206 A1* | 9/2016 | Boettcher | A01N 1/021 |
| 2017/0023377 A1* | 1/2017 | Burtner | G08B 13/2462 |
| 2018/0209802 A1 | 7/2018 | Jung et al. | |
| 2019/0147260 A1* | 5/2019 | May | G06K 9/6288 |
| | | | 382/103 |

FOREIGN PATENT DOCUMENTS

| | | |
|---|---|---|
| KR | 20150074750 A | 7/2015 |
| KR | 20170101758 A | 9/2017 |

OTHER PUBLICATIONS

"Telenav's Augmented Reality", https://www.youtube.com/watch?v=2Kt0ad03iHU (retrieved Jan. 24, 2019).

"MBUX Augmented Reality for Navigation in Mercedes-Benz A-Class 2018::[1001 cars]", https://www.youtube.com/watch?v=44myNm8T1Vw (retrieved Jan. 24, 2019).

"Windshield HUD User Interface - Augmented Reality Navigation", https://www.youtube.com/watch?v=g-_2KmHRqQM (retrieved Jan. 24, 2019).

"Hyundai Augmented Reality Demonstration —CES 2015", https://www.youtube.com/watch?v=iZg89ov75QQ (retrieved Jan. 24, 2019).

"Wikitude Navigation", https://www.wikitude.com/showcase/wikitude-navigation/ (retrieved Jan. 24, 2019).

Rusch, Michelle L. et al., "Directing driver attention with augmented reality cues", US National Library of Medicine National Institutes of Health, Jan. 16, 2013 (https://www.ncbi.nlm.nih.gov/pmc/articles/PMC3891797/).

* cited by examiner

REAL-TIME DRIVING BEHAVIOR AND SAFETY MONITORING

CROSS-REFERENCE TO RELATED APPLICATIONS

This application is a continuation of U.S. patent application Ser. No. 16/255,824 filed on Jan. 24, 2019 and claims the benefit of U.S. Provisional Patent Application No. 62/737,665 filed Sep. 27, 2018, which are hereby incorporated by reference in their entirety.

TECHNICAL FIELD

The present disclosure generally relates to vehicle safety systems and, more particularly, to mobile real-time driving safety systems and methods.

BACKGROUND

Vehicles such as automobiles are often provided with radar or infrared sensors that can alert the driver with an audible or flashing visible alerts when the vehicle is in proximity to an object or on a collision course with an object.

However, these vehicle-integrated safety systems do not include capabilities for identifying objects and providing appropriate alerts for the type, location, and relative motion of the objects in many circumstances. It would therefore be desirable to be able to provide improved vehicle safety systems.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

In accordance with aspects of the subject disclosure, a mobile real-time driving safety system is provided. The mobile real-time driving safety system may include portions implemented in a vehicle, and/or in a portable electronic device that can be carried in a vehicle and that includes a camera, global-positioning-system capabilities, and one or more sensors such as accelerometers, gyroscopes, magnetometers, and the like. The mobile real-time driving safety system may analyze driving behavior of a driver during driving of a vehicle, and provide feedback to the driver during and after driving.

Although various examples are described herein in which mobile real-time driving safety systems are implemented with a mobile phone, it should be appreciated that other implementations such as vehicle-integrated implementations, or tablet-based implementations are contemplated.

Figure 1A:
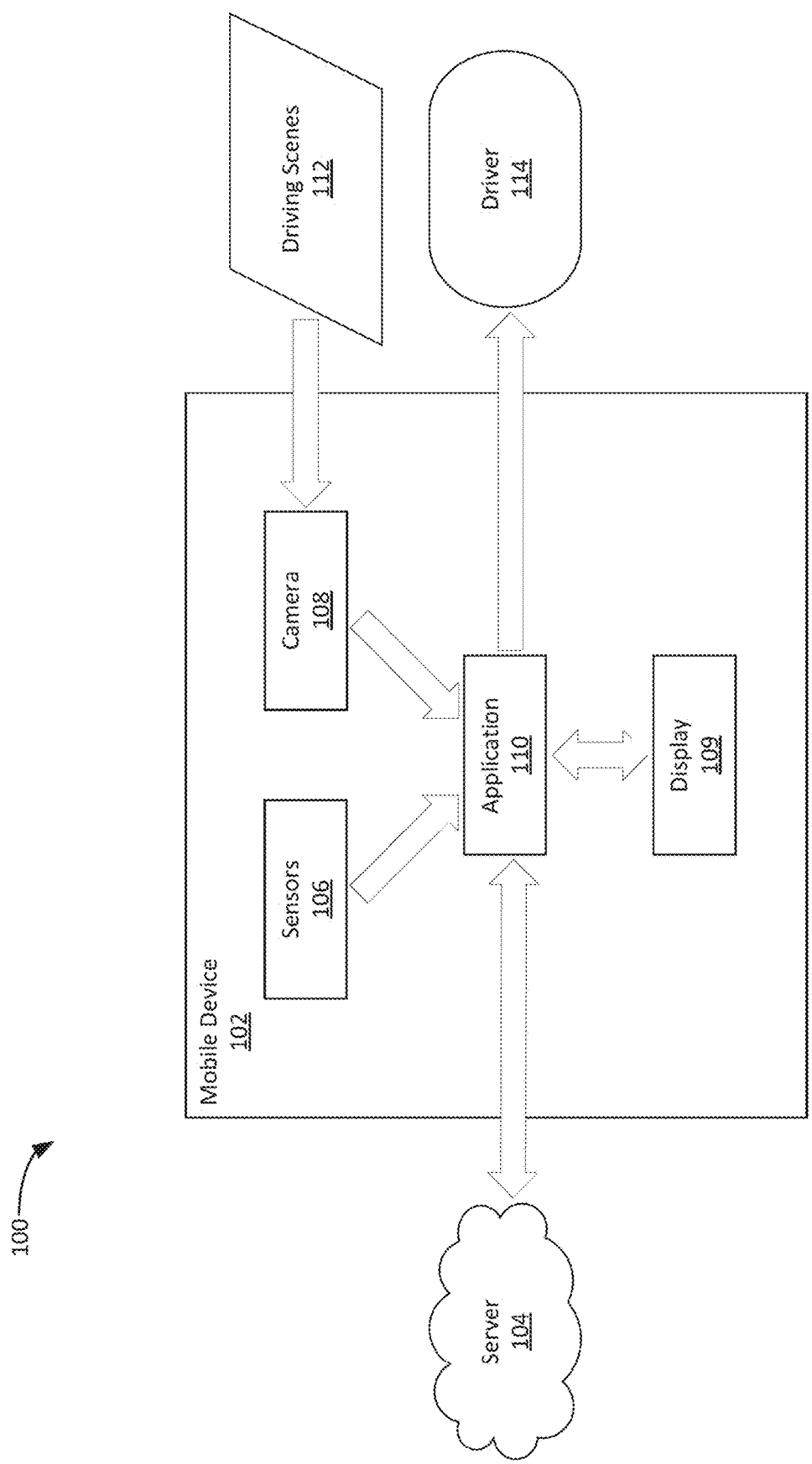
FIG. 1A is a schematic illustration of a mobile real-time driving safety system according to certain aspects of the present disclosure.

FIG. 1A illustrates an example of a mobile real-time driving safety system including a mobile phone application, in accordance with various aspects of the disclosure. As shown in FIG. 1A, a mobile real-time driving safety system 10 may include a mobile device 102, such as a mobile phone, and a remote server such as server 104. Mobile device 102 and server 104 may be communicatively coupled by a wireless network such as a cellular network. As shown, mobile device 102 may include one or more cameras such as camera 108, one or more sensors such as sensors 106 (e.g., accelerometers, gyroscopes, and/or magnetometers), and one or more displays such as display 109 (e.g., a liquid crystal display, a light-emitting-diode display, or any other suitable display) that are operable by and/or in communication with an application 110 such as a mobile driving safety application.

In one example use-case, a driver 114 places a mobile device 102, such as a mobile phone, in a vehicle (e.g., in the dashboard area) such that a camera 108 of the mobile phone is facing the road (e.g., through the windshield). For example, the mobile device 102 may be placed such that a back camera of the phone has a field of view that includes the road ahead of the vehicle and a display 109 of the mobile phone is visible to the driver. In one example, the mobile device 102 can be a device embedded in a vehicle and include a display that is a screen from the mobile device 102 to the user. In another example, the mobile device 102 can be a device embedded in a vehicle and include a display that is a head-up display (HUD) displayed on the windshield of the vehicle.

During driving of the vehicle, for example during a driving session that begins when the vehicle first starts to move and ends when the vehicle arrives at the driving session's destination and stops, a mobile driving safety application 110 running on the mobile phone analyzes a camera feed of driving scenes 112 from the camera 108, along with sensor data from one or more of the sensors 106. Based on the camera feed and the sensor data, application 110 evaluates driving behavior such as distances to cars in front of the vehicle; distances to pedestrians and cyclists or other road objects; acceleration, braking, and timing with respect to stop signs and/or red and yellow traffic lights; lane-centering; rapid and/or frequent lane changes; etc.

When applicable, application 110 alerts the driver of a potential hazard, or of potentially risky driving behavior. For example, display 109 of the mobile phone may be used to display a map (e.g., a real-time global-positioning-system map) or a live-view that adapts to the changing location of the mobile phone and vehicle, and to display icons or other indicators of roadway and/or roadside objects (e.g., pedestrians, other vehicles, sidewalks, lane delimiters, speed limits, etc.) in the vicinity of the user (e.g., as identified in the images). Application 110 may generate a visible and/or audible alert when the vehicle is approaching, or too closely passing (e.g., within a distance threshold based on the type of object and/or the vehicle speed) one of the roadside objects or exceeding the speed limit.

Figure 1B:
FIG. 1B illustrates an exemplary hazard and safety view displayed on an electronic device according to certain aspects of the present disclosure.

For example, FIG. 1B illustrates an exemplary hazard view 10 which may be displayed on display 109 of electronic device or mobile device 102. Hazard view 10 may display a live video feed of driving scenes 112 collected from camera 108 along with optional augmented reality elements to warn the user of potential hazards. The hazard view 10 may help draw the attention of the user or driver to potential hazards which the user may not have noticed. The hazard view may include interface elements such as hazard indicator 11, hazard marker 12, and hazard route overlay 13. The hazard view 10 may be triggered or activated by detection of a hazard or potential hazardous event.

Figure 2A:
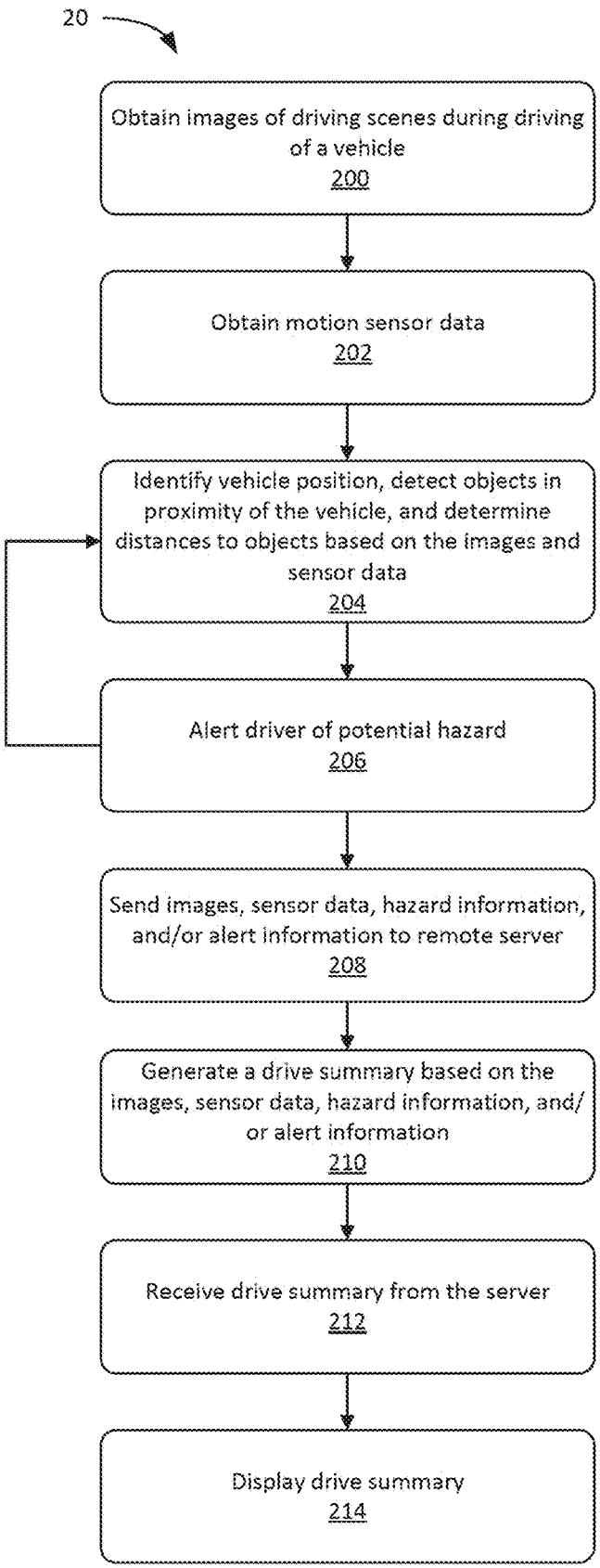
FIGS. 2A-2B illustrate flow charts of example processes for mobile real-time driving safety operations in accordance with various aspects of the subject technology.
Figure 2B:
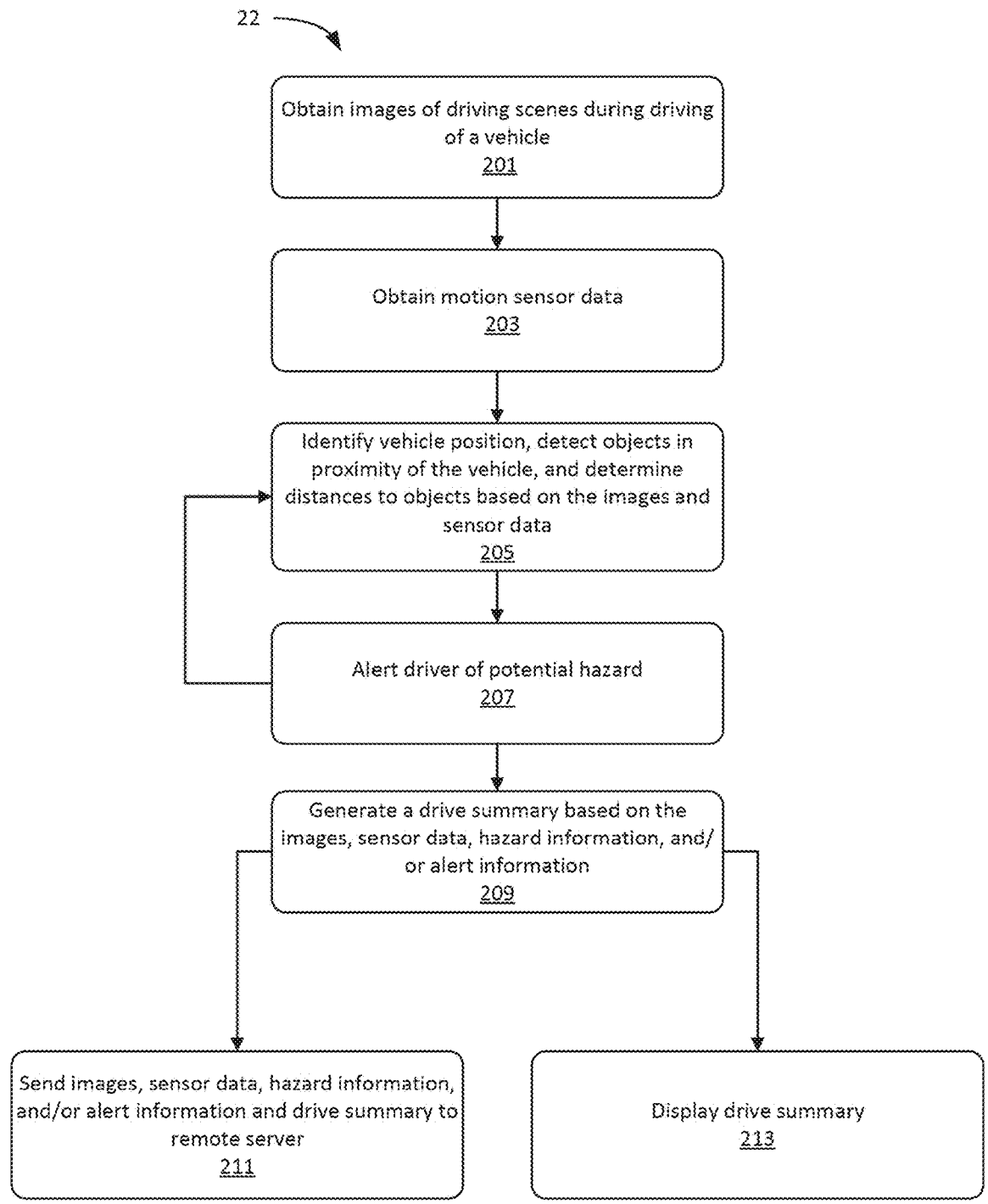

In the example illustrated in FIG. 2B, an image of a live view of a driving session is displayed. The view includes a pedestrian walking near the projected path of a vehicle with the driver and mobile device 102.

Hazard indicator 11 is a graphical indication designed to draw attention to the existence and location of a potential hazard. The hazard indicator may be of any shape or object. It may also be of any color or change colors. The hazard indicator may be displayed in a manner that associates the hazard indicator with the potential hazard. In some embodiments, the hazard indicator may include a short textual description such as "warning", "pedestrian", or "merging vehicle", or a short textual instruction such as "slow down", "watch left", or "avoid right". In some embodiments, multiple hazard indicators may be displayed when there are multiple hazards. In other embodiments a single hazard indicator may be displayed. When a single hazard indicator is displayed, it may be associated with the most urgent or dangerous hazard.

Hazard marker 12 is a graphical indication designed to help the user quickly locate or identify the potential hazard in the live view. Hazard marker 12 may be an outline, bounding box, highlight, shading, tint, glow, or other visual effect placed around the potential hazard without obscuring the potential hazard.

Hazard route overlay 13 is an augmented reality overlay which alters the appearance of a route overlay to alert the user to the existence of a potential hazard. Hazard overlay 13 may be displayed in place of the route overlay.

In one example, the potential hazards detected by the mobile device 102, based on at least the mobile device 102's sensors 106, images from camera 108, can include proximity to a road object (e.g. tailgating above a particular speed) or potential contact with a car, bike, pedestrian, other road objects, or non-road objects or road-adjacent objects. The potential hazards can also include the detecting and warning of the vehicle swerving lanes, swerving out of lane, rolling stops when the mobile device 102 detects a stop sign in the path of the vehicle, failure to stop at a stop sign or red light, speeding, or running yellow lights that turned red before the vehicle crossed the lane or running red lights.

In one example, the mobile device 102 detects lane swerving through the use of sensors 106, such as motion sensors (e.g., accelerometers, gyroscopes, and/or magnetometers), location sensors (e.g., geolocation), or image sensors. The mobile device may detect speeding of the vehicle by localizing the vehicle based on motion sensors (e.g., accelerometers, gyroscopes, and/or magnetometers), location sensors (e.g., geolocation), or image sensors to determine the vehicle's coordinates. The mobile device may determine a road the vehicle is on based on the vehicle's coordinates and retrieve a speed limit of that road from a database. The mobile device may compare the vehicle's current speed, determined by motion sensors or through retrieval by a network connection to the vehicle, to the retrieved speed limit in order to determine whether the vehicle is speeding. After localization of the vehicle, the mobile device may also identify locations of stop signs based on tagged map data including stop sign locations downloaded based on the vehicle's location or based on image data collected from the camera and object detection of a stop sign in the image data. The mobile device may detect that the vehicle passes the location of a stop sign without stopping and determine that a failure to stop event has occurred. When the mobile device detects that the vehicle slows down but does not completely stop at the location of a stop sign, the mobile device may determine that a rolling stop event has occurred.

In one example, if the vehicle is detected moving at a speed in excess of a predetermined safe speed for an upcoming curve in the roadway, application 110, of FIG. 1A, may generate an audible alert and a colored flag and/or text on display 109 to alert driver 114 of the upcoming danger. In another particular example, if the vehicle is being driven close to a right-hand edge of a driving lane and a cyclist is detected ahead near the right-hand edge in driving scenes 112, application 110 may generate an audible alert and a colored flag and/or text on display 109 to alert driver 114 of the cyclist and/or instruct the driver to center the vehicle in the driving lane.

Application 110 may generate, store, and/or send to the driver 114 or a third party a summary of driving safety behavior data after each trip and/or on-demand. The summary may include alert summaries for each alert that was detected during driving (e.g., including a type of alert, vehicle speed, acceleration, and/or other motion features at the time of the alert, and/or an image of the road and/or roadside objects associated with the alert and captured by the mobile device camera before, during, and/or after the alert). The sensor data collected from sensors 106 and image data collected from camera 108, such as in the form of video data, may be stored per driving session in addition to the list of alerts and hazards per driving session. In some examples, a driving session may comprise a trip from a start location to an end location.

In one example, the summary can include a list of each specific alert or potential hazards detected during the driving session. For example, the summary displayed to the user can include a driving summary number indicating the total number of lanes swerved during the driving session and include a list of each of the specific instances of the driver swerving lanes with timestamps of each instance. In one example, the driving summary can also display, along with the information on swerving lanes, a list of each instance of the driver speeding past a predetermined speed depending on the predetermined speed of the location of the vehicle and display it to the driver. Potential hazards may also be tracked, including pedestrians, other vehicles, bicycles, animals, construction work, and other hazards, according to where they were encountered during the driving session. In one example, for each alert or potential hazard a total number of alerts for the specific type of alert or potential hazard and/or each specific instance of the specific type of alert may be displayed. In one example, for each alert or potential hazard additional information may be displayed such as a timestamp, location, image captured during the alert or potential hazard, or video captured during the alert or potential hazard. Other alerts and potential hazards may also be output.

In one example, the summary include statistics calculated for each of the alerts or potential hazards, such as average, mean, median, mode, standard deviation, and variance of the number of each of the alerts or potential hazards. The system may also generate and display predictions about the number of alerts or potential hazards that may be encountered in a future driving session. The prediction may be based on an input route, time of day, location, the identity of the driver, or any combination of these factors.

In one example, the summary can include a visual summary including a map of the driver's route in the driving session that displays any and all of the alerts or potential hazards detected by the mobile device 102 during the driving session. The alerts or potential hazards may be displayed on the map at the location where they occurred. In some embodiments, the user may pan and zoom the map to different locations and see different alerts and potential hazards. In some embodiments, the alerts and potential hazards displayed on the map may be selectable. Upon selection by a user, a display of additional information about the alert or potential hazard may be shown, such as a timestamp, location information, image captured during the alert or potential hazard, or video captured during the alert or potential hazard. One or more user interface elements may be displayed to allow toggling between a map view and a list view to show the alerts or potential hazards.

In some examples, one or more user interface elements are provided to allow the user to select types of alerts and potential hazards to display the map. For example, in response to selection of a first type of alert or hazard, such as lane swerving, a plurality of alerts or hazards of the first type are displayed on the map. In response to selection of a second type of alert or hazard, such as speeding, a plurality of alerts or hazards of the second type are displayed on the map. In response to further user interaction, the alerts or hazards of the first type or alerts or hazards of the second type may be removed from the map.

The summary may be generated at the device or remotely (e.g., by a remote processor such as a cloud processor at server 104 that is communicatively coupled to the mobile phone). In one example, the summary is automatically generated by the server 104 or the mobile device 102. In another example, the driver or the user of the mobile device 102 can request for the driving summary at any time on-demand even if the request is made in the middle of a driving session. In this example, the summary will be based on driving alerts from the beginning of the driving session to the point of the request for the summary.

In one example, a ranking or score of the drive summary can be generated based on the contents of the summary such as the frequency of potential hazards, near misses, speeding, contact or potential contact with nearby objects, tailgating, or any other alerts that can be subject to the driver summary discussed above. The score can also be based on the magnitude of each type of alert. For example, an alert for a potential contact between the vehicle and another vehicle can have a different score depending on how close, in distance the potential contact was detected. A closer distanced near miss can have a different score than a further distanced near miss. In one example, both the frequency of alerts and the magnitude of the alerts can be calculated to generate the score of the drive summary.

In one example, the summary can include multiple scores based on different types of alerts. For example, the frequency and magnitude of near misses (discussed in the paragraph above) can determine a score of the driver's ability to keep a safe distance in the driving session. The frequency or magnitude of speeding above a predetermined speed in a given location or above or below another type of threshold can determine a separate score of the driver's ability to keep a safe speed. Other types of alerts can be used to generate other types of scores based on that specific type of alert.

In one example, an overall score of a specific type of alert can also be generated based on the frequency and magnitude of alerts across multiple driving sessions for that specific type of alert. For example, scoring of safe driving speed can be based on the speed alerts for a given driving session and a separate overall scoring of safe driving speed can be based on the speed alerts across multiple driving sessions.

In one example, a score of the driver's profile can be generated and changed based on the aggregate scores based of each of the different types of alerts across multiple driving sessions accumulated by the driver. The score can be considered the overall score of the driver's profile.

In one example, the score of the drive summary can be stored in the server and/or displayed to the driver at the driver's request or automatically at the end of the driving session. In another example, a rank can be generated based on the score.

In some examples, the drive summary contains longitudinal data tied to a specific user. The mobile device 102 may receive an identifier of the user before a driving session to determine the relevant driver to associate with the driving session. The mobile device 102 and/or server 104 may store and track data for a particular user and collect longitudinal data about the user over time in each of the user's driving sessions. The longitudinal data may include sensor data from sensors 106, image data from camera 108, potential hazards, alerts, data about trip length and trip time, and other data. The longitudinal data may display to the user information about his or her driving performance over time.

In some examples, drive summary contains statistical information about the driving of multiple users. The multiple users may be in a population of users or a cohort of the population. Data may be collected and stored for the population or cohort including sensor data from sensors 106, image data from camera 108, potential hazards, alerts, data about trip length and trip time, and other data. Statistical information for the population or cohort may include statistics calculated for any of the aforementioned data, including but not limited to the alerts or potential hazards, such average, mean, median, mode, standard deviation, and variance. In some embodiments, the population or cohort of users may be filtered by demographic information such as age, gender, driving experience, type of vehicle, geographic location, occupation, educational background, insurance plan, insurance company, or other information. In some examples, the mobile device 102 may generate and display information comparing the performance of a particular driver to a cohort or population of other drivers. In some embodiments, the cohort or population is selected to contain only drivers who are similar or comparable in at least one demographic field to the particular driver.

The display of information comparing the performance of the particular driver to the cohort or population may display comparisons of, for example, overall number of alerts and potential hazards, average number of alerts and potential hazards per driving session, most common types of alerts and potential hazards, and cumulative safety rating. Comparisons may also be displayed per type of alert or potential hazard. For example, a comparison may be displayed of overall or per-driving session alerts and potential hazards of a first type and a separate comparison may be displayed of overall or per-driving session alerts and potential hazards of a second type.

The mobile device 102 and/or server 104 may also generate a risk profile of a particular driver to measure the overall risk of this driver. The risk profile may comprise numerical data about the likelihood of adverse events like alerts and potential hazards or accidents. In some examples, the risk profile may comprise a risk score that summarizes the level of risk of the driver encountering adverse events. The risk profile may be generated using longitudinal data about a driver and population and cohort data about other drivers. In one example, the risk profile is generated by comparing the longitudinal data about the alerts and potential hazards of a driver with statistical information about the alerts and potential hazards of a population or cohorts of other drivers.

In some examples, the mobile device 102 and/or server 104 may track the improvement of a particular driver over time. For example, the reduction in the number of alerts and potential hazards may be tracked longitudinally to determine that the number is decreasing from earlier driving sessions to more recent driving sessions. A notification may be displayed to inform the user of his or her driving performance increase. In other examples, an increase in the number of alerts and potential hazards may be tracked longitudinally to determine that the number is increasing from earlier driving sessions to more recent driving sessions, and a warning may be generated to the user that driving performance is worsening.

In some examples, the mobile device 102 and/or server 104 may predict future performance of a user based on the past longitudinal data of the user. Predictions may be generated for driving performance in future driving sessions, including predictions of the number of alerts and potential hazards overall or of a particular type. Predicted data may be displayed in graphs or plots to show the extrapolated data in the future.

In some examples, drive summary data of one or more users may be provided to third parties, such as insurance companies, for risk assessment purposes, such as determining the premium price of a vehicle insurance policy for the user based on his or her past driving performance in the drive summary. The data provided in the drive summary may be of any of the types described herein, such as longitudinal, population data, cohort data, risk profiles, raw data, sensor data, and other data. In some examples, the drive summary data is made available to third parties through an application programming interface (API). In some examples, the price of a vehicle insurance premium is generated by a machine learning model, such as a neural network, based on accepting at least a portion of the drive summary as input.

FIGS. 2A-B depict flow diagrams of example processes for mobile real-time driving safety operations, in accordance with various aspects of the subject technology. For explanatory purposes, the example processes of FIGS. 2A-B is described herein with reference to the components of FIG. 1A. Further for explanatory purposes, some blocks of the example processes of FIGS. 2A-B are described herein as occurring in series, or linearly. However, multiple blocks of the example processes of FIGS. 2A-B may occur in parallel. In addition, the blocks of the example processes of FIGS. 2A-B need not be performed in the order shown and/or one or more of the blocks of the example processes of FIGS. 2A-B need not be performed.

In the depicted example flow diagram 20 of FIG. 2A, at block 200, images of driving scenes such as driving scenes 112 may be obtained. Obtaining the images may include capturing streaming image frames using a camera such as camera 108 of a mobile device such as mobile device 102 mounted in a vehicle, or using a vehicle-integrated camera such as a dashboard camera.

At block 202, sensor data such as motion sensor data (e.g., speed data, acceleration data, location data, or the like) is obtained. The sensor data may be obtained from sensors 106 in the mobile device and/or sensors in the vehicle.

At block 204, an application such as mobile driving safety application 110 analyze the obtained images of driving scenes 112 data in conjunction with the obtained sensor data to identify, during driving (e.g., at the current time), an object in proximity of the vehicle, the vehicle's position on the road (e.g., lane centering), and/or distances to other vehicles, pedestrians, cyclists, and/or other identified objects in proximity of the vehicle. Identification of the object based on the obtained images and obtained sensor may be performed using, for example, an object detection or semantic segmentation machine learning model. The machine learning models may comprise a neural network with one or more convolutional neural network layers.

At block 206, an alert (e.g., an audible, visible, and/or tactile alert) is detected (e.g., by the application with the mobile device) of a potential hazard, based on the analyzed images and sensor data. For example, application 110 may identify a potential hazard associated with an identified object based on the image and the motion sensor data, and generate the alert associated with the potential hazard for a driver of the vehicle. Application 110 may display a real-time global-positioning-system map with a display 109 of the mobile phone during the drive, and generate the alert by adding a visible alert to the real-time global-positioning-system map at a location of the identified object.

At block 208, the images, sensor data, hazard information, alert information, and/or other information (e.g., GPS information) may be sent to a remote server such as server 104 (e.g., over a cellular, WiFi, or other communications network). The images, sensor data, hazard information, alert information, and/or other information may be sent in real time to the server or may be stored at the mobile phone or vehicle for bulk upload to the server upon connection to a computer or WiFi network.

At block 210, the server and/or the application may generate a summary of the drive (e.g., a drive summary) based on the images, sensor data, hazard information, and/or alert information. The drive summary may include a list of alerts with images, and/or statistical representations of the drive (e.g., a percentage of time centered in a driving lane or driving under or over a speed limit, and/or a number of alerts per mile or per unit time). The drive summary may include indications of improvements or declines of various driving safety indicators relative to one or more previous drive summaries. Generating the drive summary may include generating one or more driving safety statistics based on the images and the sensor data.

At block 212, the drive summary, if generated at remote server 104, is sent from the server to the mobile device.

At block 214, the drive summary may be displayed (e.g., using display 109) for the driver (e.g., at the end of the drive such as when the vehicle stops for a period of time, or when the vehicle is turned off). The drive summary may include information associated with one or more alerts. The drive summary may be stored at the mobile device and/or at the server.

In the depicted example flow diagram 22 of FIG. 2B, at block 201, images of driving scenes such as driving scenes 112 may be obtained. Obtaining the images may include capturing streaming image frames using a camera such as camera 108 of a mobile device such as mobile device 102 mounted in a vehicle, or using a vehicle-integrated camera such as a dashboard camera.

At block 203, sensor data such as motion sensor data (e.g., speed data, acceleration data, location data, or the like) is obtained. The sensor data may be obtained from sensors 106 in the mobile device and/or sensors in the vehicle.

At block 205, an application such as mobile driving safety application 110 analyze the obtained images of driving scenes 112 data in conjunction with the obtained sensor data to identify, during driving (e.g., at the current time), an object in proximity of the vehicle, the vehicle's position on the road (e.g., lane centering), and/or distances to other vehicles, pedestrians, cyclists, and/or other identified objects in proximity of the vehicle.

At block 207, an alert (e.g., an audible, visible, and/or tactile alert) is detected (e.g., by the application with the mobile device) of a potential hazard, based on the analyzed images and sensor data. For example, application 110 may identify a potential hazard associated with an identified object based on the image and the motion sensor data, and generate the alert associated with the potential hazard for a driver of the vehicle. Application 110 may display a real-time global-positioning-system map with a display 109 of the mobile phone during the drive, and generate the alert by adding a visible alert to the real-time global-positioning-system map at a location of the identified object.

At block 209, the application 110 may generate a summary of the drive (e.g., a drive summary) based on the images, sensor data, hazard information, and/or alert information. The drive summary may include a list of alerts with images, and/or statistical representations of the drive (e.g., a percentage of time centered in a driving lane or driving under or over a speed limit, and/or a number of alerts per mile or per unit time). The drive summary may include indications of improvements or declines of various driving safety indicators relative to one or more previous drive summaries. Generating the drive summary may include generating one or more driving safety statistics based on the images and the sensor data.

At block 211, the drive summary, along with the images, sensor data, hazard information, alert information, and/or other information (e.g., GPS information) may be sent to a remote server such as server 104 (e.g., over a cellular, WiFi, or other communications network). The images, sensor data, hazard information, alert information, and/or other information may be sent in real time to the server or may be stored at the mobile phone or vehicle for bulk upload to the server upon connection to a computer or WiFi.

At block 213, the drive summary may be displayed (e.g., using display 109) for the driver (e.g., at the end of the drive such as when the vehicle stops for a period of time, or when the vehicle is turned off). The drive summary may include information associated with one or more alerts. The drive summary may be stored at the mobile device and/or at the server.

Figure 3:
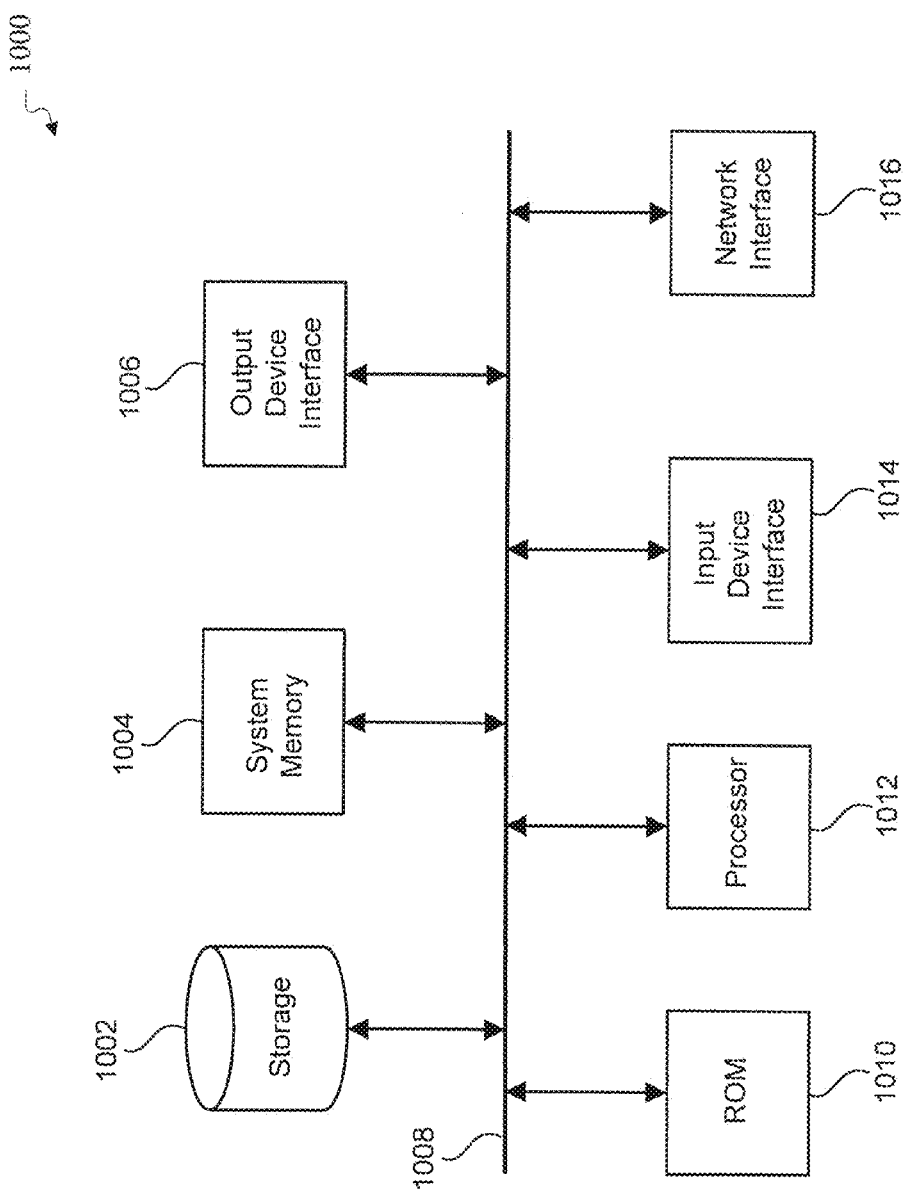
FIG. 3 illustrates an electronic system with which one or more implementations of the subject technology may be implemented.

FIG. 3 conceptually illustrates electronic system 1000 with which one or more aspects of the subject technology may be implemented. Electronic system 1000, for example, may be, or may be a part of, an augmented reality (AR) navigation system implemented in standalone device, a portable electronic device such as a laptop computer, a tablet computer, a phone, a wearable device, or a personal digital assistant (PDA), a vehicle, or generally any electronic device that transmits signals over a network. Such an electronic system includes various types of computer readable media and interfaces for various other types of computer readable media. Electronic system 1000 includes bus 1008, processing unit(s) 1012, system memory 1004, read-only memory (ROM) 1010, permanent storage device 1002, input device interface 1014, output device interface 1006, and network interface 1016, or subsets and variations thereof.

Bus 1008 collectively represents all system, peripheral, and chipset buses that communicatively connect the numerous internal devices of electronic system 1000. In one or more embodiments, bus 1008 communicatively connects processing unit(s) 1012 with ROM 1010, system memory 1004, and permanent storage device 1002. From these various memory units, processing unit(s) 1012 retrieves instructions to execute and data to process in order to execute the processes of the subject disclosure. The processing unit(s) can be a single processor or a multi-core processor in different embodiments.

ROM 1010 stores static data and instructions that are needed by processing unit(s) 1012 and other modules of the electronic system. Permanent storage device 1002, on the other hand, is a read-and-write memory device. This device is a non-volatile memory unit that stores instructions and data even when electronic system 1000 is off. One or more embodiments of the subject disclosure use a mass-storage device (such as a magnetic or optical disk and its corresponding disk drive) as permanent storage device 1002.

Other embodiments use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such as random access memory. System memory 1004 stores any of the instructions and data that processing unit(s) 1012 needs at runtime. In one or more embodiments, the processes of the subject disclosure are stored in system memory 1004, permanent storage device 1002, and/or ROM 1010. From these various memory units, processing unit(s) 1012 retrieves instructions to execute and data to process in order to execute the processes of one or more embodiments.

Bus 1008 also connects to input and output device interfaces 1014 and 1006. Input device interface 1014 enables a user to communicate information and select commands to the electronic system. Input devices used with input device interface 1014 include, for example, alphanumeric keyboards, pointing devices (also called "cursor control devices"), cameras or other imaging sensors, or generally any device that can receive input. Output device interface 1006 enables, for example, the display of images generated by electronic system 1000. Output devices used with output device interface 1006 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more embodiments may include devices that function as both input and output devices, such as a touch screen. In these embodiments, feedback provided to the user can be any form of sensory feedback, such as visual feedback, auditory feedback, or tactile feedback; and input from the user can be received in any form, including acoustic, speech, or tactile input.

Finally, as shown in FIG. 3, bus 1008 also couples electronic system 1000 to a network (not shown) through network interface 1016. In this manner, the computer can be a part of a network of computers (such as a local area network ("LAN"), a wide area network ("WAN"), or an Intranet, or a network of networks, such as the Internet. Any or all components of electronic system 1000 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more embodiments, the computer readable media is non-transitory computer readable media, computer readable storage media, or non-transitory computer readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that some or all steps, operations, or processes may be performed automatically, without the intervention of a user. Method claims may be provided to present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the appended claims. Moreover, nothing disclosed herein is intended to be dedicated to the public regardless of whether such disclosure is explicitly recited in the claims. No claims element is to be construed under the provisions of 35 U.S.C. § 112 (f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Brief Description of the Drawings, and Claims of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in any claim. Rather, as the following claims s reflect, inventive subject matter lies in less than all features of a single disclosed configuration or operation. The following claims are hereby incorporated into the Detailed Description, with each claims standing on its own to represent separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A method, comprising:
   obtaining an image of a driving scene for a vehicle during a drive using a first device;
   obtaining motion sensor data during the drive using the first device;
   identifying an object based on the image using a machine learning model;
   identifying a potential hazard associated with the object based on the image and the motion sensor data;
   generating an alert associated with the potential hazard for a driver of the vehicle;
   displaying the alert in an augmented reality interface with an augmented reality hazard marker to identify the potential hazard; and
   displaying a drive summary for the drive, the drive summary comprising information associated with the alert; and
   wherein the information associated with the alert comprises at least one of an alert type, a vehicle speed, a vehicle acceleration, and a time of the alert;
   wherein the drive summary comprises:
      a visual summary comprising a map of a route of the drive with visual indicators of the alert and one or more additional alerts at a location on the map where the alerts occurred, the visual indicator,
      one or more user interface (UI) elements configured to display selected types of alerts and potential hazards on the map and to not display unselected types of alerts and potential hazards on the map; and
      information comparing the performance of the driver to a cohort or population.

2. The method of claim 1, wherein the visual indicators are selectable to display the information associated with the alerts.

3. The method of claim 1, wherein the drive summary includes statistics for alerts encountered during the drive and a comparison to statistics for other drivers.

4. The method of claim 1, wherein the drive summary includes a plurality of scores associated with different alert types and an aggregate score based on combining the plurality of scores.

5. The method of claim 1, further comprising sending the image and the motion sensor data to a remote server.

6. The method of claim 5, further comprising:
   generating the drive summary at the remote server; and
   receiving the drive summary from the remote server.

7. The method of claim 6, wherein generating the drive summary comprises generating one or more driving safety statistics based on the images and the motion sensor data.

8. The method of claim 7, further comprising generating one or more ranking and/or score of each of the one or more driving safety statistics.

9. The method of claim 6, further comprising generating a ranking and/or score of the drive summary.

10. The method of claim 6, wherein the drive summary comprises generating a map view of each alert associated with each of the potential hazards displayed on the map view.

11. The method of claim 1, further comprising generating a prediction corresponding to a number of alerts that may be encountered in a future driving session.

12. The method of claim 1, further comprising generating an individualized risk profile for a particular driver.

13. The method of claim 1, wherein the drive summary includes one or more numbers indicating the number of lanes swerved during a driving session.

14. The method of claim 13, wherein the drive summary can display one or more specific instances of the lanes swerved during a driving session and display timestamps associated with each of the one or more specific instances of the lanes swerved.

15. The method of claim 1, wherein the drive summary includes and displays one or more instances of the vehicle moving above a predetermined speed based on a location.

16. The method of claim 1, wherein the information comparing the performance of the driver to the cohort or population comprises comparisons of one or more of: overall number of alerts and/or potential hazards, average number of alerts and/or potential hazards, most common types of alerts and/or potential hazards, and cumulative safety rating.

17. The method of claim 1, wherein the information comparing the performance of the driver to the cohort or population is displayed per type of alert and/or potential hazard.

18. The method of claim 1, wherein the drive summary further comprises one or more visual indications of improvements or declines of driving safety indicators relative to one or more previous drive summaries.

19. The method of claim I, wherein the drive summary further comprises information tracking the performance of the driver over time relative to one or more previous drive summaries.

20. The method of claim 19, wherein the information tracking the performance of the driver over time relative to the one or more previous drive summaries comprises tracking of an increase or reduction in the number of alerts and/or potential hazards.

* * * * *